INVENTOR.
REINHOLD EMMERT

BY Michael S. Striker

ATTORNEY

INVENTOR.
REINHOLD EMMERT
BY
ATTORNEY

United States Patent Office 3,511,451

Patented May 12, 1970

3,511,451

TAPE RECORDING AND REPRODUCING APPARATUS WITH AUTOMATIC MOTOR ARRESTING OR REVERSING MEANS

Reinhold Emmert, Nuremberg, Germany, assignor to Grundig E.M.V., Elektro-Mechanische Versuchsanstalt Inh.; Max Grundig, Furth, Bavaria, Germany Filed Feb. 1, 1968, Ser. No. 702,388
Claims priority, application Germany, Feb. 4, 1967, G 49,186
Int. Cl. G11b *23/04;* B65h *25/14, 25/32*
U.S. Cl. 242—200 15 Claims

ABSTRACT OF THE DISCLOSURE

A magnetic tape recording and reproducing apparatus wherein an electric motor drives a spindle which rotates one of two reels in a magazine to transport magnetic tape from the supply reel toward the takeup reel or vice versa. When the spindle comes to a halt or its speed decreases upon collection of tape on one of the reels, the motor is arrested or reversed in response to opening of one or more switches in the motor circuit. Such opening is effected by a spring serving to bias two pivotable switching members against the periphery of a cam which rotates with the spindle. The cam has lobes which hold the switching members away from its periphery when the rotational speed of the spindle exceeds a certain minimum speed. The bias of the spring is opposed by a delay device including portions of the switching members, their support and a tough viscous paste which delays movements of switching members under the action of the spring so that the switching members can reach the periphery of the cam only when the frequency at which the lobes engage the switching members is less than required by the spring to move the switching members against the periphery of the cam.

Background of the invention

The present invention relates to magnetic tape recording and reproducing apparatus, and more particularly to improvements in apparatus wherein the motor which causes the tape to be convoluted on the supply reel or takeup reel is either arrested or reversed when the tape is fully collected by one of the reels. Still more particularly, the invention relates to improvements in apparatus utilizing tape which preferably is stored on reels installed in a magazine or cassette wherein the ends of tape are affixed to or anchored in the cores of such reels.

It is already known to provide a tape recorder with a control system which arrests or reverses the motor when the tape is fully collected by the supply reel or takeup reel. For example, certain tape recorders which utilize tape stored in removable magazines are provided with interrupter switches which are driven by the spindle for one of the reels. The switch produces short-lasting impulses when the spindle rotates and such short-lasting impulses cannot open the motor circuit. When the tape is withdrawn from one of the reels so that only the respective end of the tape remains attached to such reel, the spindle is arrested in a predetermined angular position and thereby allows the interrupter switch to close for an interval of time which is long enough to insure that the motor circuit opens. A serious drawback of such tape recorders is that it is quite difficult to insure stoppage of spindles in a predetermined angular position and that the part or parts of a magazine and of the tape recorder proper which effect such stoppage are quite complicated, costly and prone to malfunction. Therefore, such control systems failed to gain widespread acceptance by the manufacturers and/or by the users.

It is also known to provide a tape recorder with a control system which automatically arrests or reverses the motor when the tape is fully collected by the takeup reel or supply reel and wherein such change in the condition of the motor can take place irrespective of the angular position of the spindle or spindles. These control systems rely on the fact that the momentum of the driving spindle increases when the tape is fully collected by its reel or on the differential principle, i.e., that a change in direction of rotation takes place when the spindle which is driven by unwinding tape comes to a halt. The just described control systems are quite complicated, expensive and prone to malfunction. Moreover, they are effective only when the tape travels in a certain direction, i.e., from the takeup reel toward the supply reel or vice versa.

Summary of the invention

It is an object of my invention to provide a tape recording and reproducing apparatus with a simple, rugged, inexpensive and reliable control system which is capable of automatically arresting or reversing the motor when the tape is fully collected by the supply reel or by the takeup reel and which is effective irrespective of whether the tape travels from the supply reel toward the takeup reel or vice versa.

Another object of the invention is to provide a control system which does not necessitate the use of specially designed magazines or cassettes and which occupies little room.

The invention is embodied in a tape recording and reproducing apparatus having a rotary member which is connected with one of two reels in a tape magazine wherein the ends of tape are anchored in the reels. The novel combination comprises motor means operative to drive the rotary member (preferably by way of a friction clutch or the like) in at least one of two directions so as to draw tape from one of the reels and to convolute the thus withdrawn tape on the other reel, and control means for changing the condition of motor means in response to a reduction in the speed of the rotary member to a predetermined minimum value (including zero speed). The control means comprises delay means or retard means opposing a change in the condition of the motor means when the speed of the rotary member exceeds the aforementioned minimum value.

In accordance with a presently preferred embodiment of my invention, the control means may be used to arrest the motor means when the rotary member is halted by tape upon complete convolution of tape on one of the reels. The parts of the control means may include a cam rotating with the rotary members and having one or more lobes, and a pair of switching members pivotable with reference to a support and biased by a spring toward the periphery of the cam to open one or more switches in the motor circuit when allowed to reach the periphery of the cam. The lobes cooperate with the delay means to prevent the switching members from reaching the periphery of the cam when the speed of the rotary member exceeds the minimum value. The delay means may include portions of the switching members, the aforementioned support and a coat of tough viscous paste between such portions and the support to oppose pivotal movements of switching members under the action of the spring.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

Description of the preferred embodiments

Figures 1, 1A, 2:
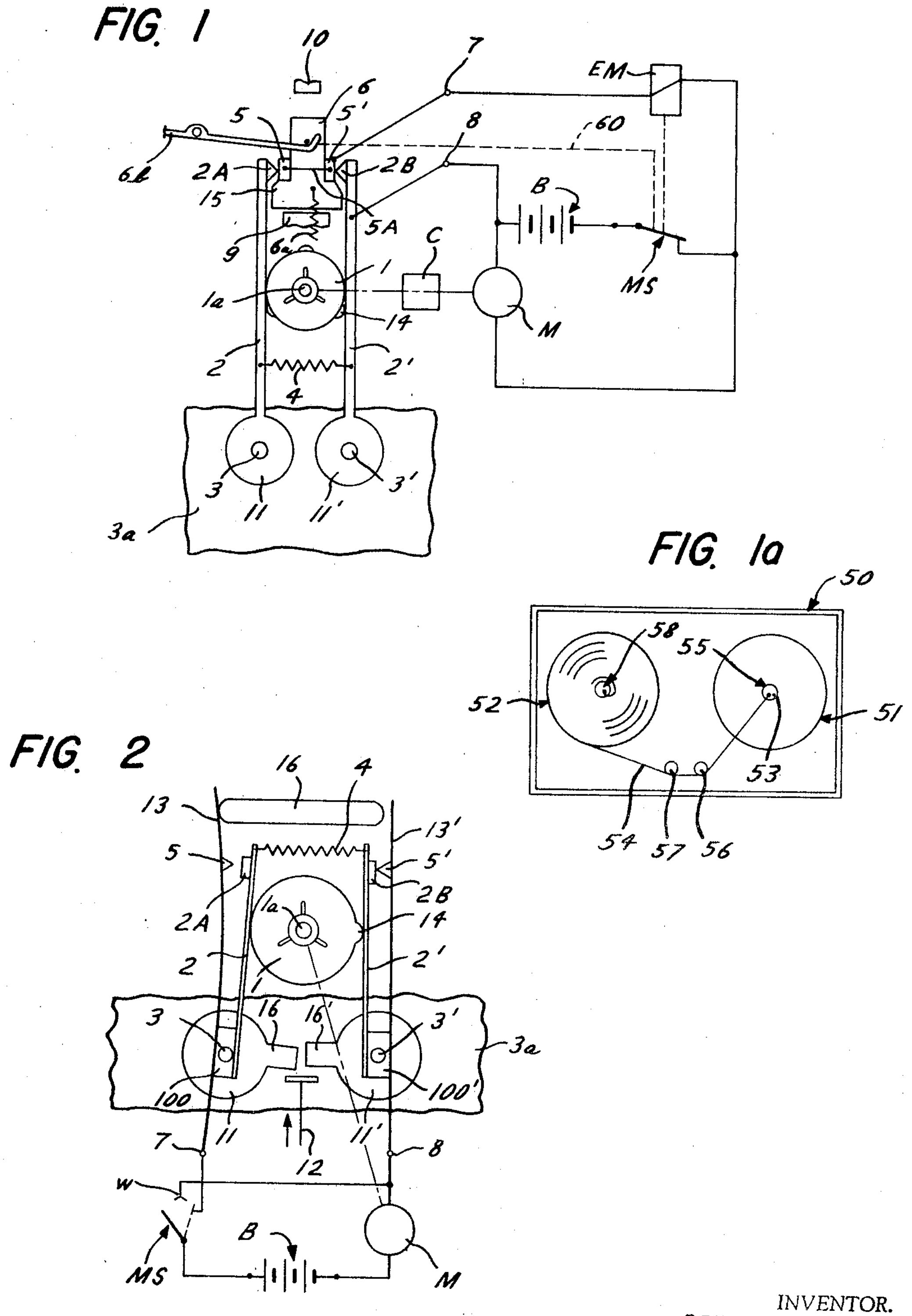
FIG. 1 is a schematic view of a portion of a tape recording and reproducing apparatus which embodies one form of my invention.
FIG. 1*a* is a schematic top plan view of a magazine which can be used in the apparatus of FIG. 1.
FIG. 2 is a fragmentary schematic view of a second apparatus.

Referring first to FIG. 1*a*, there is shown a portion of a magazine or cassette 50 which can be utilized in the apparatus of my invention. The magazine comprises a housing or casing 50*a* accommodating a supply reel 51 and a takeup reel 52. One end 53 of the tape 54 preferably forms a loop or eye and is affixed off center to a pin or the like on the core 55 of the supply reel 51. The tape 54 is guided by posts or rolls 56, 57 so that, when the last convolution of tape is removed from the core 55, the latter is arrested in a predetermined angular position as shown in FIG. 1*a*, i.e., the end 53 is then located in a plane including the axis of the core 55 and extending tangentially of the post or roll 56. The core 58 of the takeup reel 52 is driven during recordal or reproduction to draw tape 54 from the supply reel 51. The other end of tape 54 is mounted on the core 58 of the reel 52 in the same way as shown for the end 53 and core 55, i.e., the core 58 is arrested in a predetermined angular position when the entire supply of tape is collected by the supply reel 51 in response to rotation of reel 51 in a counterclockwise direction, as viewed in FIG. 1*a*. The cores 55, 58 are provided with suitable coupling devices adapted to engage complementary coupling devices in the apparatus so that one thereof can be positively driven when the other is not driven, or vice versa, depending upon whether the operator wishes to record or reproduce information (the tape then travels from the reel 51 toward the reel 52) or whether the tape is to be transferred from reel 52 back onto the reel 51 (rewinding).

FIG. 1 illustrates a control system which regulates the operation of drive means in an apparatus utilizing magazines 50 of the type shown in FIG. 1*a*. A switch actuating member 1 resembles a disk shaped cam and is mounted on a spindle 1*a* which can drive the core 55 or 58, for example, the core 55 of the supply reel 51. Thus, the cam 1 rotates as long as the tape 54 travels in a direction from the reel 52 toward the reel 51. This cam 1 is provided with one or more projections or lobes 14 which can pivot two switching members 2, 2' resembling one-armed levers and turnable on pivot pins 3, 3' mounted on a stationary support 3*a* of the apparatus, e.g., on the tape deck. A helical spring 4 operates between the switching members 2, 2' and biases them toward each other, i.e., against the cam 1. FIG. 1 illustrates the switching members 2, 2' in their operative or inner end positions in which they bear against the periphery of the cam 1, i.e., not against the lobe or lobes 14. The upper or free ends of the switching members 2, 2' respectively carry contacts 2A, 2B which then engage complementary contacts 5, 5' provided on a reciprocable control member 6 of insulating material. The control member 6 is movable between two end positions determined by fixed abutments or stops 9 and 10. When it engages the stop 9, the control member maintains the contacts 5, 5' at the level of and in registry with the contacts 2A, 2B. This control member 6 is biased toward the stop 9 by a spring 6*a* and can be moved against the stop 10 by a lever 6*b*. The contacts 5, 5' are electrically connected with each other, as at 5A. The lower end portion 15 of the control member 6 is widened and resembles a wedge. It can move into the space between the contacts 2A, 2B when the control member 6 engages the stop 10, i.e., the switching members 2, 2' are then moved apart and away from the cam 1 because their contacts 2A, 2B engage the side faces of the end portion 15.

The contact 5' is connected with a first terminal 7 and the switching member 2' is connected with a second terminal 8. The spring 4 and switching members 2, 2' consist of conductive metallic material so that a current can flow between the terminals 7, 8 when at least one of the contacts 2A, 2B engages the respective contact 5 or 5'. The provision of two switching members is a safety measure because a single switching member (2 or 2') would normally suffice to insure satisfactory operation of the apparatus.

The electric circuit of the apparatus shown in FIG. 1 further includes a battery B or another source of electrical energy connected in series with a master switch MS and an electromagnet EM, and an electric motor M which can drive the cam 1 by way of a friction clutch C and is in series with the battery B and master switch MS. The control member 6 closes the switch MS by way of a connection 60 when it abuts against the stop 9, and the electromagnet EM opens the switch MS when it is energized by way of the switch 2A, 5 and/or 2B, 5'.

In accordance with an important feature of my invention, the switching members 2, 2' are respectively provided with enlarged portions or bearing members 11, 11' which are in frictional engagement with the support 3*a* or with a counterbearing provided on such support. In order to enhance friction, the adjoining surfaces of bearing members 11, 11' and support 3*a* are coated with a highly viscous tough substance, e.g., with silicone paste, which opposes the bias of spring 4 and permits only gradual return movement of switching members 2, 2' toward each other. Movements of these switching members away from each other are effected by the lobes 14 of the cam 1 or by the lower end portion 15 of the control member 6.

The operation is as follows:

When the user wishes to start the apparatus, the control member 6 is released by lever 6*b* to assume the position shown in FIG. 1. The master switch MS is thereby closed and the circuit of the motor M is completed so that the motor drives the cam 1 by way of the clutch C. Full energization of the electromagnet EM requies a certain interval of time so that the master switch MS remains closed and the motor M has time to change the angular position of the cam 1 so that the lobes 14 move the switching members 2, 2' apart and disengage the contacts 2A, 2B from the contacts 5, 5'. Thus, the electromagnet EM is fully deenergized and cannot open the master switch MS. The paste between the bearing members 11, 11' and support 3*a* opposed the bias of the spring 4 so that it takes longer to move the switching member 2 or 2' back to inner end position than to rotate the cam 1 through an angle equalling that between the adjoining lobes 14 (this angles is about 120 degrees if the cam 1 carries three equidistant lobes 14). Consequently, the contacts 2A, 2B remain spaced from contacts 5, 5' as long as the motor M is running and as long as the cam 1 can rotate in response to torque transmitted by the friction clutch C.

When the tape 54 is fully convoluted on the core 55 of the supply reel 51, the corresponding end of the tape arrests the core 58 in the angular position analogous to that shown in FIG. 1*a* for the core 55. The cam 1 is then in the position shown in FIG. 1 and the tape 54 opposes its rotation, i.e., the clutch C ceases to transmit torque but the motor M continues to run. However, and since the cam 1 is arrested in an angular position in which its lobes 14 cannot prevent movement of switching members 2, 2' to their inner end positions, the spring 4 gradually overcomes the opposition of paste between the parts 3*a* and 11, 11' so that the switch 2A, 5 and/or 2B, 5' closes to energize the electromagnet EM which opens the master switch MS to arrest the motor M. Instead of shutting off the motor M, the electromagnet FM can reverse the direction of rotation of the motor to thereby drive the core 58 in a sense to collect the tape 54 on the takeup reel 52. This can be achieved by providing a friction clutch which drives the core 58 when the motor M rotates in a predetermined direction. The motor is arrested again when the end 53 of the tape 54 arrests the core 55 in the angular position shown in FIG. 1*a*.

When the apparatus is to be arrested or the recordal or reproduction of sound interrupted, the user actuates the lever 6*b* to move the control member 6 against the stop 10. The enlarged portion 15 of the control member 6 then maintains the switching members 2, 2' in spaced-apart positions and the control member also opens the master switch MS to arrest the motor M. The electromagnet EM remains deenergized because the contacts 2A, 2B are held away from the contacts 5, 5' by the enlarged portion 15 which consists of insulating material.

In order to restart the motor M, the user simply causes or allows the control member 6 to return into abutment with the stop 9. The end portion 15 then releases the switching members 2, 2' for movement toward their inner end positions; however, the resistance offered by paste between the parts 3*a* and 11, 11' is sufficient to retard such movement under the bias of the spring 4 so that the motor M can rotate the cam 1 before the members 2, 2' reach their inner end positions and the lobes 14 thereupon hold the contacts 2A, 2B away from the contacts 5, 5' to prevent energization of the electromagnet EM while the tape 54 is running from the reel 51 toward the reel 52 or vice versa.

FIG. 2 illustrates a portion of a modified control system. The cam 1 has lobes 14 and can be driven by a motor M to move the switching members 2, 2' apart and to maintain the contacts 2A, 2B in engagement with contacts 5, 5' provided on two elastic tongues 13, 13'. The tongues cause the contacts 5, 5' to bear against the contacts 2A, 2B with a predetermined pressure (e.g., 20 p.). A spreading or tensioning member 16 maintains the tongues 13, 13' under requisite stress. The switching members 2, 2' are biased against the cam 1 by a spring 4 and are affixed to insulating blocks 100, 100' which are rigid with bearing members 11, 11'. These bearing members cooperate with a fixed support 3*a* in the same way as described in connection with FIG. 1, i.e., they oppose the bias of the spring 4 and tend to retard movement of contacts 2A, 2B away from contacts 5, 5'. The tongues 13, 13' are provided with terminals 7, 8 and consist of conductive material, the same as the switching members 2, 2' and spring 4.

The control member 12 is movable upwardly from the position shown in FIG. 2 to engage two projections or arms 16, 16' of the bearing members 11, 11' and to move the switching members 2, 2' apart so as to maintain the contacts 2A, 2B in engagement with the contacts 5, 5'. The terminals 7, 8 are connected in a circuit which includes a battery B, the motor M and a master switch MS. The latter is movable from an open position (shown in solid lines) to an intermediate position and to a closed position (shown by broken lines). The circuit of the motor M is completed when the master switch MS is in the intermediate position (in which it engages a contact W) and also when the master switch moves to closed position provided that the contacts 2A, 2B then engage the contacts 5, 5', i.e., that the cam 1 rotates and its lobe 14 holds the switching members 2, 2' away from their inner end positions. The motor M is arrested automatically when the cam 1 is idle because at least one of the contacts 2A, 2B is then disengaged from the associated contact 5 or 5'. It will be noted that the two switches including the contacts 2A, 5 and 2B, 5' are in series. Instead of arresting the motor M, opening of the switch 2A, 5 and/or 2B, 5' can cause the motor M to drive the supply reel if the cam 1 drives the takeup reel, or vice versa. The paste between the bearing members 11, 11' and support 3*a* prevents rapid disengagement of contacts 2A, 2B from contacts 5, 5' in response to bias of the spring 4.

The control member 12 moves the master switch MS to open position when it moves upwardly to disengage the switching members 2, 2' from the cam 1. The motor M is arrested when the switch MS is open despite the fact that the switches 2A, 5 and 2B, 5' are closed. This is the "stop" or "interrupt" setting of the apparatus.

In order to start the motor M again, the user moves the control member 12 back to the position shown in FIG. 2. The master switch MS moves to intermediate position to complete the motor circuit via contact W so that the motor M begins to rotate the cam 1, and the switch MS thereupon moves to closed position to complete the motor circuit by way of switches 2A, 5 and 2B, 5'. The resistance offered by bearing members 11, 11' to the bias of spring 4 suffices to prevent opening of switches 2A, 5 and 2B, 5' during movement of master switch MS from intermediate to closed position.

Figure 3:
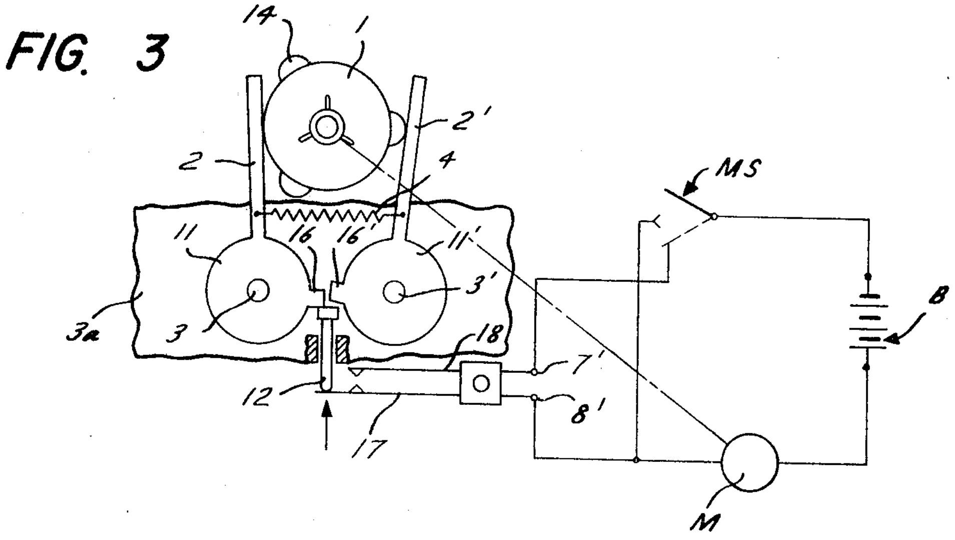
FIG. 3 is a fragmentary schematic view of a third apparatus.

In FIG. 3, the switching members 2, 2' can open a switch 17, 18 through the intermediary of a reciprocable control member 12 and arms 16, 16' on the bearing members 11, 11'. The switch 17, 18 is connected in series with the master switch MS. The arm 16 or 16' causes the control member 12 to open the switch 17, 18 when at least one of the switching members 2, 2' is free to engage the periphery of the cam 1 (i.e., not one of the lobes 14) under the bias of the spring 4. The manner in which the bearing members 11, 11' cooperate with the support 3*a* to oppose the action of the spring 4 is the same as described in connection with FIG. 1. The circuit of the motor M is completed when the master switch MS is closed and when the switching members 2, 2' are held away from the periphery of the cam 1 by the lobes 14, i.e., when the tape travels from the supply reel to the takeup reel or vice versa.

Figure 4:
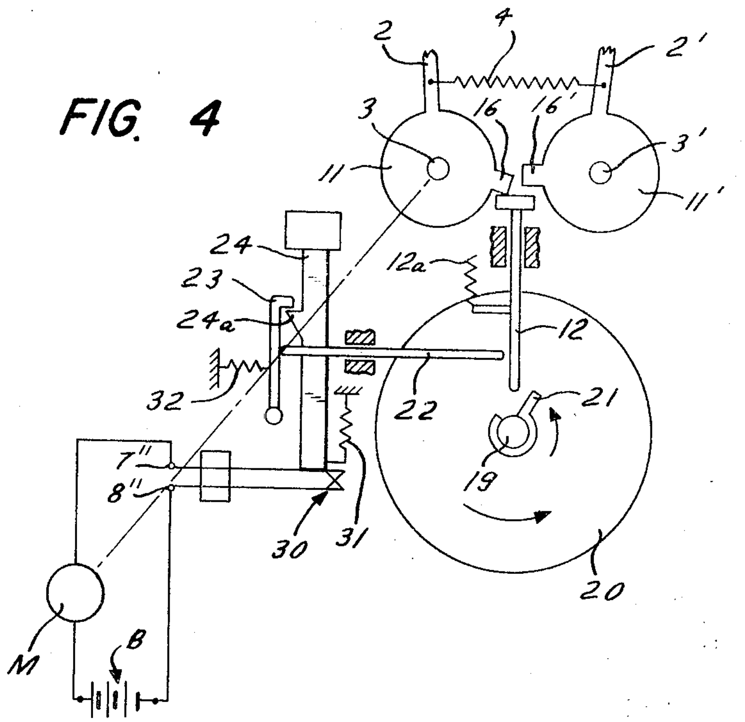
FIG. 4 is a fragmentary schematic view of a fourth apparatus.

In the apparatus of FIG. 4, the motor M for the cam (not shown) which determines the angular position of switching members 2, 2' is controlled exclusively by mechanical means. The numeral 19 denotes the sound shaft which carries a flywheel or mass 20. When one of the switching members 2, 2' is free to assume its inner end position, the arm 16 or 16' of the associated bearing member 11 or 11' shifts the control member 12 in downward direction, as viewed in FIG. 4, and into the path of movement of a motion transmitting lug 21 on the shaft 19. The control member 12 is flexible and the lug 21 deflects it against a push rod 22 which disengages a pawl 23 from a tooth 24*a* on a pushbutton 24 which is depressed by the operator in order to close a switch 30 and to thus start the motor M. The tooth 24*a* is biased against the pawl 23 by a return spring 31 which urges the pushbutton 24 to its starting or idle position. The pawl 23 is biased by a spring 32 and the shaft 19 is driven by the motor M.

It will be seen that the arm 16 and/or 16' automatically opens the switch 30 by way of control member 12, lug 21, push rod 22, pawl 23 and spring 31 when the cam which controls the position of switching members 2, 2' comes to a halt. A weak spring 12*a* biases the control member 12 upwardly and away from the path of the lug 21. The latter is preferably mounted on the shaft 19 by friction so that it ceases to rotate when it engages and effects requisite flexing of the member 12.

The pushbutton 24 is depressed again when the user wishes to restart the motor M. The motor then rotates a cam which causes the switching members 2, 2' to move away from each other and the arms 16, 16' move upwardly so that the spring 12*a* can move the control member 12 away from the path of the lug 21. The manner in which the bearing members 11, 11' cooperate with a support to oppose the action of the spring 4 is the same as described in connection with FIG. 1.

All embodiments of my invention exhibit the important advantage that the motor M can be arrested or the direction of its rotation reversed irrespective of the direction of rotation of the spindle 1*a* and irrespective of the exact angular position of this spindle when the tape 54 is fully collected by the takeup reel or by the supply reel. All that counts is to allow the spring 4 sufficient time to effect a change in the condition of the motor M when the speed of the spindle 1*a* is reduced to a predetermined minimum speed (including zero speed) when the frequency at which the lobe or lobes 14 move the switching members 2, 2' away from the periphery of the cam 1 is less than necessary to overcome the action of the delay means or retard means (including the paste and the parts 3*a*, 11, 11').

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

I claim:

1. In a magnetic tape recording and/or reproducing apparatus having a rotary member which is connected with one of two reels in a magazine wherein the ends of tape are secured to the reels, a combination comprising motor means operative to drive said rotary member in at least one of two directions so as to draw tape from one of the reels and to convolute the thus withdrawn tape on the other reel; and control means for changing the condition of said motor means in response to a reduction in the speed of said rotary member to a predetermined minimum value, said control means comprising a second rotary member rotatable by said motor means at a speed which is proportioned to the speed of said first mentioned rotary member, switching means tending to assume an end position in which said switching means effects a change in the condition of said motor means and being movable by said second rotary member from said end position thereof, and delay means opposing the tendency of said switching means to move to said end position thereof during intervals between successive engagements of said second rotary member with said switching means when the frequency of such engagements exceeds a minimum frequency corresponding to said predetermined minimum speed of said first mentioned rotary member.

2. In a magnetic tape recording and/or reproducing apparatus having a rotary member which is connected with one of two reels in a magazine wherein the ends of tape are secured to the reels, a combination comprising motor means operative to drive said rotary member in at least one of two directions so as to draw tape from one of the reels and to convolute the thus withdrawn tape on the other reel; and control means for changing the condition of said motor means in response to a reduction in speed of said rotary member to a predetermined minimum value, said control means comprising at least one projection rotatable by said motor means at a speed which is proportional to the speed of said rotary member, a switching member movable by said projection from an end position in which said switching member effects a change in the condition of said motor means, biasing means urging said switching member to said end position, and delay means opposing the action of said biasing means to prevent movement of said switching member to said end position during intervals between successive engagements of said projection with said switching member when the frequency of such engagements exceeds a minimum frequency corresponding to said predetermined minimum speed of said rotary member.

3. A combination as defined in claim 2, wherein said predetermined minimum value equals zero speed of said rotary member.

4. A combination as defined in claim 2, wherein said projection forms part of a cam which rotates with said rotary member and has a surface which is engaged by said switching member when the latter assumes said end position.

5. A combination as defined in claim 2, wherein said delay means comprises a support, a portion of said switching member which is adjacent to and is movable relative to said support by said projection and by said biasing means, and friction generating means interposed between said support and said portion of said switching member.

6. A combination as defined in claim 5, wherein said friction generating means includes a layer of viscous paste.

7. A combination as defined in claim 6, wherein said portion of said switching member is pivotable with reference to said support.

8. A combination as defined in claim 16, wherein said control means further comprises a second switching member movable by said projection from an end position and urged to such end position by said biasing means to change the condition of said motor means when allowed to assume its end position, said delay means being arranged to oppose the action of said biasing means upon said second switching member when the frequency of engagements between said projection and said second switching member exceeds said minimum frequency.

9. A combination as defined in claim 8, wherein said control means further includes an electric circuit for said motor means and a pair of parallel-connected switches in said circuit, each of said switches including a first contact and a second contact on one of said switching members, said second contacts engaging the respective first contacts in the end positions of said switching members.

10. A combination as defined in claim 8, wherein said control means further includes an electric circuit for said motor means and a pair of series-connected switches in said circuit, each of said switches including a first contact and a second contact provided on one of said switching members, said second contacts engaging the respective first contacts when said switching members are moved away from said end positions thereof.

11. A combination as defined in claim 2, wherein said control means further comprises a control member operative to move said switching member from said end position independently of said projection.

12. A combination as defined in claim 11, wherein said switching member is pivotable to and from said end position and said projection constitutes a lobe of a cam which rotates with said rotary member, said switching member abutting against said cam in said end position thereof and said control member being arranged to move said switching member away from said cam.

13. A combination as defined in claim 12, wherein said switching member is arranged to change the condition of said motor means by way of said control member in said operative position thereof.

14. A combination as defined in claim 11, wherein said control member is operated by the sound shaft of the apparatus.

15. A combination as defined in claim 11, wherein said motor means includes an electric motor and said control member is movable by said switching member to a predetermined position when the switching member assumes said end position to thereby open a switch in the circuit of said electric motor.

References Cited

UNITED STATES PATENTS

| | | | |
|---|---|---|---|
| 1,814,739 | 7/1931 | Preddey | 200—61.17 |
| 2,236,411 | 3/1941 | Metcalf | 200—33 |
| 2,514,402 | 7/1950 | Lyon | 200—61.17 X |
| 3,250,871 | 5/1966 | Wigger. | |
| 3,365,615 | 1/1968 | Bart | 307—120 X |

GEORGE F. MAUTZ, Primary Examiner

U.S. Cl. X.R.

200—33, 61.17; 242—57, 201; 307—120, 141